US012776966B2

(12) United States Patent
Tesfatsion et al.

(10) Patent No.: US 12,776,966 B2
(45) Date of Patent: Oct. 27, 2026

(54) METHOD FOR ALIGNING QUALITY OF SERVICE IN MOBILE NETWORK AND EDGE CLOUD

(71) Applicant: TELEFONAKTIEBOLAGET LM ERICSSON (PUBL), Stockholm (SE)

(72) Inventors: Selome Kostentinos Tesfatsion, Upplands Väsby (SE); Xuejun Cai, Täby (SE); Jinhua Feng, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 57 days.

(21) Appl. No.: 18/692,724

(22) PCT Filed: Oct. 6, 2021

(86) PCT No.: PCT/IB2021/059181
§ 371 (c)(1),
(2) Date: Mar. 15, 2024

(87) PCT Pub. No.: WO2023/057794
PCT Pub. Date: Apr. 13, 2023

(65) Prior Publication Data
US 2024/0388512 A1 Nov. 21, 2024

(51) Int. Cl.
*H04L 41/5019* (2022.01)
*H04L 41/5067* (2022.01)
(Continued)

(52) U.S. Cl.
CPC ...... *H04L 41/5019* (2013.01); *H04L 41/5067* (2013.01); *H04L 67/10* (2013.01); *H04L 67/51* (2022.05)

(58) Field of Classification Search
None
See application file for complete search history.

(56) References Cited

U.S. PATENT DOCUMENTS 10,541,928 B2 1/2020 Shih et al.
10,904,358 B2 1/2021 Bellur
(Continued)

FOREIGN PATENT DOCUMENTS

CN 113064712 B 5/2022

OTHER PUBLICATIONS

"5G;System architecture for the 5G System (5GS) (3GPP TS 23.501 version 16.6.0 Release 16)", Technical Specification, ETSI TS 123 501 V16.6.0 (Oct. 2020), 450 Pages.
(Continued)

*Primary Examiner* — Quang N Nguyen
(74) *Attorney, Agent, or Firm* — Ericsson Inc.

(57) ABSTRACT

A method by one or more computing devices to configure an edge cloud to meet an end-to-end performance target for a microservices-based application that is implemented over the edge cloud and a mobile network is disclosed. The method includes determining a cloud-side performance target for the application based on the E2E performance target, network-side QoS control information, and network-side performance information, determining microservice instances of a microservice chain in the edge cloud that can be used to meet the cloud-side performance target for the application based on cloud-side service information, cloud-side resource usage information, and cloud-side performance information, determining cloud-side QoS parameters and a resource configuration for the microservice instances, and configuring the edge cloud to implement the microservice instances including applying the cloud-side QoS parameters and the resource configuration to the microservice instances.

20 Claims, 6 Drawing Sheets

(51) Int. Cl.
*H04L 67/10* (2022.01)
*H04L 67/51* (2022.01)

(56) References Cited

U.S. PATENT DOCUMENTS

| | | | | |
|---|---|---|---|---|
| 11,956,121 | B1 * | 4/2024 | Joshi | H04L 41/0886 |
| 12,150,211 | B2 * | 11/2024 | Belleschi | H04W 4/08 |
| 12,438,786 | B2 * | 10/2025 | Chen | H04W 24/02 |
| 2004/0049570 | A1 | 3/2004 | Frank et al. | |
| 2015/0103670 | A1 * | 4/2015 | Wu | H04L 47/808<br>370/236.1 |
| 2015/0222549 | A1 | 8/2015 | Kakadia et al. | |
| 2016/0197794 | A1 | 7/2016 | Wang et al. | |
| 2017/0373950 | A1 * | 12/2017 | Szilagyi | H04L 43/026 |
| 2018/0279319 | A1 * | 9/2018 | Yu | H04W 40/12 |
| 2020/0112872 | A1 * | 4/2020 | Nimbavikar | H04W 28/0289 |
| 2020/0229199 | A1 * | 7/2020 | Xin | H04W 72/54 |
| 2021/0014133 | A1 | 1/2021 | Maciocco et al. | |
| 2022/0174485 | A1 * | 6/2022 | Abhigyan | H04W 12/06 |
| 2022/0215002 | A1 * | 7/2022 | Luo | H04L 67/1097 |
| 2024/0155469 | A1 * | 5/2024 | Ramamurthi | H04W 40/22 |

OTHER PUBLICATIONS

"5G; Policy and charging control framework for the 5G System (5GS); Stage 2 (3GPP TS 23.503 version 16.5.0 Release 16)", Technical Specification, ETSI TS 123 503 V16.5.0 (Jul. 2020), 120 Pages.

* cited by examiner

METHOD FOR ALIGNING QUALITY OF SERVICE IN MOBILE NETWORK AND EDGE CLOUD

This application is a 371 of International Application No. PCT/IB2021/059181, filed on Oct. 6, 2021, the disclosure of which is fully incorporated herein by reference.

TECHNICAL FIELD

Embodiments of the invention relate to the field of edge computing, and more specifically, to configuring an edge cloud to meet an end-to-end performance target for a microservices based application that is implemented over the edge cloud and a mobile network communicatively coupled to the edge cloud.

BACKGROUND

Edge computing is a distributed computing paradigm that brings computation and data storage closer to the sources of data. Edge computing is designed to reduce latency and bandwidth consumption in a communication network.

With edge computing, an application may be implemented over a mobile network and an edge cloud. With the advancement of mobile network and cloud technologies, as well as the emerging stringent requirements for various applications, quality of service (QoS) and end user satisfaction (e.g., quality of experience (QoE)) have become important factors for both mobile network operators and cloud providers.

SUMMARY

A method by one or more computing devices to configure an edge cloud to meet an end-to-end (E2E) performance target for a microservices-based application that is implemented over the edge cloud and a mobile network communicatively coupled to the edge cloud is disclosed. The method includes obtaining network-side quality of service (QoS) control information and network-side performance information associated with the application, determining a cloud-side performance target for the application based on the E2E performance target, the network-side QoS control information, and the network-side performance information, obtaining cloud-side service information, cloud-side resource usage information, and cloud-side performance information associated with the application, determining microservice instances of a microservice chain in the edge cloud that can be used to meet the cloud-side performance target for the application based on the cloud-side service information, the cloud-side resource usage information, and the cloud-side performance information, determining cloud-side QoS parameters for the microservice instances based on the cloud-side performance target and knowledge regarding a performance associated with the cloud-side QoS parameters, determining a resource configuration for the microservice instances based on the cloud-side performance target for the application, the cloud-side service information, the cloud-side resource usage information, and the cloud-side performance information, and configuring the edge cloud to implement the microservice instances including applying the cloud-side QoS parameters and the resource configuration to the microservice instances.

A set of non-transitory machine-readable media having computer code stored therein, which when executed by a set of one or more processors of one or more computing device, causes the one or more computing devices to perform operations for configuring an edge cloud to meet an E2E performance target for a microservices-based application that is implemented over the edge cloud and a mobile network communicatively coupled to the edge cloud is disclosed. The operations include obtaining network-side QoS control information and network-side performance information associated with the application, determining a cloud-side performance target for the application based on the E2E performance target, the network-side QoS control information, and the network-side performance information, obtaining cloud-side service information, cloud-side resource usage information, and cloud-side performance information associated with the application, determining microservice instances of a microservice chain in the edge cloud that can be used to meet the cloud-side performance target for the application based on the cloud-side service information, the cloud-side resource usage information, and the cloud-side performance information, determining cloud-side QoS parameters for the microservice instances based on the cloud-side performance target and knowledge regarding a performance associated with the cloud-side QoS parameters, determining a resource configuration for the microservice instances based on the cloud-side performance target for the application, the cloud-side service information, the cloud-side resource usage information, and the cloud-side performance information, and configuring the edge cloud to implement the microservice instances including applying the cloud-side QoS parameters and the resource configuration to the microservice instances.

A computing device to configure an edge cloud to meet an E2E performance target for a microservices-based application that is implemented over the edge cloud and a mobile network communicatively coupled to the edge cloud is disclosed. The computing device includes one or more processors and a non-transitory machine-readable medium having computer code stored therein, which when executed by the one or more processors, causes the computing device to obtain network-side QoS control information and network-side performance information associated with the application, determine a cloud-side performance target for the application based on the E2E performance target, the network-side QoS control information, and the network-side performance information, obtain cloud-side service information, cloud-side resource usage information, and cloud-side performance information associated with the application, determine microservice instances of a microservice chain in the edge cloud that can be used to meet the cloud-side performance target for the application based on the cloud-side service information, the cloud-side resource usage information, and the cloud-side performance information, determine cloud-side QoS parameters for the microservice instances based on the cloud-side performance target and knowledge regarding a performance associated with the cloud-side QoS parameters, determine a resource configuration for the microservice instances based on the cloud-side performance target for the application, the cloud-side service information, the cloud-side resource usage information, and the cloud-side performance information, and configure the edge cloud to implement the microservice instances including applying the cloud-side QoS parameters and the resource configuration to the microservice instances.

BRIEF DESCRIPTION OF THE DRAWINGS

The invention may best be understood by referring to the following description and accompanying drawings that are used to illustrate embodiments of the invention. In the drawings.

DETAILED DESCRIPTION

Figure 1:
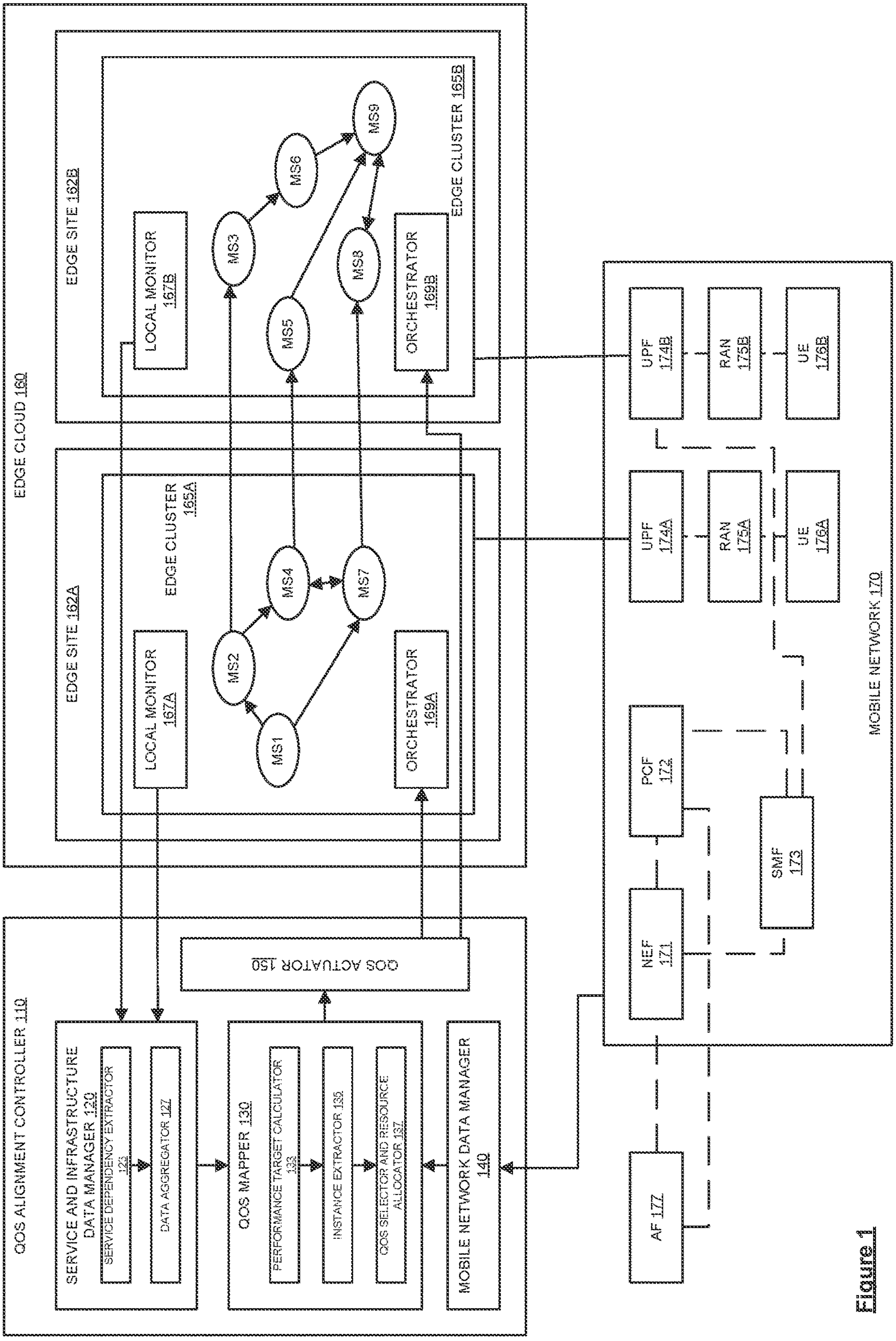
FIG. 1 is a diagram of an environment that includes a quality of service (QoS) alignment controller that is operable to configure an edge cloud to meet an end-to-end (E2E) performance target for a microservices-based application, according to some embodiments.

The following description describes methods and apparatus for configuring an edge cloud to meet an end-to-end (E2E) performance target for a micro-services based application that is implemented over the edge cloud and a mobile network. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Bracketed text and blocks with dashed borders (e.g., large dashes, small dashes, dot-dash, and dots) may be used herein to illustrate optional operations that add additional features to embodiments of the invention. However, such notation should not be taken to mean that these are the only options or optional operations, and/or that blocks with solid borders are not optional in certain embodiments of the invention.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

An electronic device stores and transmits (internally and/or with other electronic devices over a network) code (which is composed of software instructions and which is sometimes referred to as computer program code or a computer program) and/or data using machine-readable media (also called computer-readable media), such as machine-readable storage media (e.g., magnetic disks, optical disks, solid state drives, read only memory (ROM), flash memory devices, phase change memory) and machine-readable transmission media (also called a carrier) (e.g., electrical, optical, radio, acoustical or other form of propagated signals-such as carrier waves, infrared signals). Thus, an electronic device (e.g., a computer) includes hardware and software, such as a set of one or more processors (e.g., wherein a processor is a microprocessor, controller, microcontroller, central processing unit, digital signal processor, application specific integrated circuit, field programmable gate array, other electronic circuitry, a combination of one or more of the preceding) coupled to one or more machine-readable storage media to store code for execution on the set of processors and/or to store data. For instance, an electronic device may include non-volatile memory containing the code since the non-volatile memory can persist code/data even when the electronic device is turned off (when power is removed), and while the electronic device is turned on that part of the code that is to be executed by the processor(s) of that electronic device is typically copied from the slower non-volatile memory into volatile memory (e.g., dynamic random access memory (DRAM), static random access memory (SRAM)) of that electronic device. Typical electronic devices also include a set of one or more physical network interface(s) (NI(s)) to establish network connections (to transmit and/or receive code and/or data using propagating signals) with other electronic devices. For example, the set of physical NIs (or the set of physical NI(s) in combination with the set of processors executing code) may perform any formatting, coding, or translating to allow the electronic device to send and receive data whether over a wired and/or a wireless connection. In some embodiments, a physical NI may comprise radio circuitry capable of receiving data from other electronic devices over a wireless connection and/or sending data out to other devices via a wireless connection. This radio circuitry may include transmitter(s), receiver(s), and/or transceiver(s) suitable for radiofrequency communication. The radio circuitry may convert digital data into a radio signal having the appropriate parameters (e.g., frequency, timing, channel, bandwidth, etc.). The radio signal may then be transmitted via antennas to the appropriate recipient(s). In some embodiments, the set of physical NI(s) may comprise network interface controller(s) (NICs), also known as a network interface card, network adapter, or local area network (LAN) adapter. The NIC(s) may facilitate in connecting the electronic device to other electronic devices allowing them to communicate via wire through plugging in a cable to a physical port connected to a NIC. One or more parts of an embodiment of the invention may be implemented using different combinations of software, firmware, and/or hardware.

A network device (ND) is an electronic device that communicatively interconnects other electronic devices on the network (e.g., other network devices, end-user devices). Some network devices are "multiple services network devices" that provide support for multiple networking functions (e.g., routing, bridging, switching, Layer 2 aggregation, session border control, Quality of Service, and/or subscriber management), and/or provide support for multiple application services (e.g., data, voice, and video).

One of the key factors that affects quality of experience (QoE) is the QoS parameters of a mobile network. Various efforts have been undertaken to correlate the QoS parameters of a mobile network with QoF. This has given, for example, network operators the ability to tune network performance (e.g., in terms of delay, jitter, packet loss rate, quality of service (QoS) flow level, etc.) to enhance the end user experience. In 5th generation (5G) mobile networks, for example, QoS flows are used to model QoS. Each QoS flow in the mobile network may have a 5G QoS Identifier (5QI). 5QI is a pointer to specific QoS forwarding characteristics in the mobile network (e.g., packet delay budget, packet error rate, priority level, etc.). On the other hand, the QoS parameter allocation and retention priority (ARP) includes information about priority level, pre-emption capability, and vulnerability. The ARP priority level is used to differentiate mobile network traffic in case of resource limitations. A QoS flow may be assigned an ARP priority level between 1 and 15 with 1 being the highest priority level. A QoS flow with a higher ARP priority level will receive preferential treatment compared to a QoS flow with a lower ARP priority level. The ARP pre-emption capability defines whether a QoS flow gets resources that are assigned to another lower priority QoS flow. The ARP pre-emption vulnerability defines whether a QoS flow loses the resources assigned to it in order to admit a higher priority QoS flow. The values for the ARP pre-emption capability and vulnerability may be set to either 'enabled' or 'disabled'.

In 3rd Generation Partnership Project (3GPP) based mobile networks, the core network provides the framework for policy based control of the service behavior and end user experiences (i.e., Policy and Charging Control (PCC)). One function of PCC is to provide service aware QoS for certain services. The QoS for the services can be dynamically changed by the network operator or can be based on some dynamic information (e.g., the current network conditions). The Policy Control Function (PCF), the central entity in PCC, may provide the Session Mobility Function (SMF) with the authorized QoS for Internet Protocol (IP) flows, and the SMF may enforce the QoS control decision by setting up the appropriate QoS parameters in the User Plane Function (UPF), which enforce the QoS. PCF may expose an interface to the Application Function (AF) that allows the AF to influence the PCC rules and/or subscribe to events reported by the PCF.

Different kinds of QoS controls have been proposed in the cloud including scheduling, auto-scaling, load balancing, bandwidth limitation, and intra-cloud network traffic prioritization.

Various QoS-driven scheduling techniques have been proposed for the cloud to find suitable nodes to allocate the admitted requests to meet the promised Service Level Objective (SLO) target (e.g., availability guarantees).

Auto-scaling mechanism allows an application or system deployed inside a cloud infrastructure to autonomously adapt its capacity to workload demands over time (e.g., keep the level of performance of the application to a certain level despite changes in workload). In general, when there is an increase in requests and resources are constrained, the auto-scaling mechanism may decide to provision certain resources to the application deployed in the cloud. Subsequently, the auto-scaling mechanism may decide to deprovision certain resources from the deployed application when the number of requests has decreased.

Many cloud infrastructures provide auto-scaling capabilities for deployed workloads or services. For example, Kubernetes provides both vertical and horizontal scaling capabilities. While the Horizontal Pod Autoscaler (HPA) scales the number of pods available in a cluster in response to the current computational needs, the Vertical Pod Autoscaler (VPA) allocates more (or less) central processing units (CPUs) and memory to existing pods.

For cases where auto-scaling is not able to solve the congestion problem (e.g., because of an infrastructure-wide overload), service differentiation (e.g., prioritizing some services more than others) may be used to minimize performance degradation. With service differentiation, services are assigned different QoS levels and are allocated resources based on weights. When there are resource constraints, lower priority services are throttled depending on the performance of higher priority services. For CPU allocation, for example, the Linux Control Group (CGroup)-Quota management, may be used to impose a hard limit on the amount of CPU time a task can use. Within each given time period (e.g., the default is 100 milliseconds), an instance may consume only up to a certain quota of CPU time. This prevents an instance from consuming more than its allocated share of resources. The isolation can further be improved by pinning virtual CPU's (vcpus) to physical CPUs (pcpus).

Load balancing mechanisms attempt to efficiently distribute traffic among nodes running multiple instances of a service to enhance user experience. A load balancer can be configured with weights to differentiate traffic in the cloud infrastructure to meet performance requirements. Traffic may be distributed to available nodes according to their respective weights. When traffic exceeds available capacity, packets may be dropped or delayed for low priority requests. Traffic can also be configured not to use more than the configured amount of bandwidth.

With the increasing popularity and maturity of the lightweight virtualization technology (e.g., container technology), the microservices-based architecture is being adopted by more and more applications or services. In a microservices-based architecture, the service is decomposed into multiple modular and granular microservices (e.g., processes or containers) which may be small in size, messaging enabled, bounded by contexts, decentralized, and deployed, built, and released independently with automated processes. The microservices may work together and communicate with each other through a web application programming interface (API) (e.g., a RESTful API (REST stands for representational state transfer)) or message queues. Each microservice may expose an API and can be invoked by other microservices or external clients. In a microservices-based application, the service request coming from clients may involve interactions among multiple microservices.

An execution graph, sometimes referred to as a microservice chain, describes communication dependencies between the microservices to fulfill a given request from the client. A service can involve a complex interplay of microservice chains involving many microservices.

QoS can be defined in terms of Service Level Agreements (SLAs) that are part of the service provider's commitments to a consumer of the service. A SLA is an agreement that specifies the measurable metrics, the level of services to be delivered, and the remedies and penalties if the expected level of services is not met. A Service Level Objective (SLO), a key element of SLA, defines the expected level of service between the provider and the consumer. It provides a quantitative means to define the level of service that a consumer can expect from a provider. For example, the SLO target for an availability metric may be specified as 99.95% service uptime and the SLO target for a latency metric may specify that 95% of requests are to be returned within 10 milliseconds over a given time period.

For an application that is implemented over a mobile network and an edge cloud, the E2E performance is mainly determined by the performance of the application at the mobile network side and the edge cloud side, and hence the SLO targets are specified to represent the E2E performance target covering both the mobile network and cloud-side requirements.

For a microservices-based application, the SLO targets are specified at the microservice chain level since a microservice chain represents the path of a request as it propagates through multiple microservice instances before reaching completion.

As mentioned above, the PCC framework may dynamically control the QoS policy or traffic behavior for an application in the mobile network. However, in conventional systems, it is not aligned with the QoS control in the cloud. The PCC framework cannot influence the QoS or traffic behavior outside of the mobile network (e.g., in the cloud infrastructure).

Moreover, the existing QoS control mechanisms for the cloud do not reflect the QoS control policy in the mobile network for the application. The QoS policies in the cloud will be applied to the application regardless of what QoS control policy is applied in the mobile network. As such, the QoS policies in the cloud fail to identify and react to situations where the root cause of the QoS problem is outside of the cloud domain (e.g., in the mobile network).

Although the QoS control in both domains (the mobile network and the cloud) contribute to an enhanced user experience, the end user's QoE is usually decided by the E2E QoS of the application which consists of QoS in both the mobile network and the cloud. Unsynchronized QoS control between the mobile network and the cloud may result in inconsistent and unpredictable E2E QoE.

Thus, a QoS control mechanism that aligns the QoS parameters of the mobile network with the QoS parameters of the cloud is needed in order to improve the E2E end user experience.

Embodiments are described herein that are able to align the QoS control in the mobile network with the QoS control in the edge cloud, and tune the edge cloud to provide synchronized and enhanced E2E QoE. Embodiments may correlate QoS parameters specified in the mobile network (e.g., delay, jitter, packet loss rate, QoS Flow level-5QI and ARP priority level) to QoS parameters in the edge cloud (e.g. bandwidth limiting, prioritized traffic routing, CPU and memory scaling, pod/container/virtual machine (VM) scaling), and configure the edge cloud to meet the E2E QoS requirements. Embodiments obtain dynamically changing QoS control information from the mobile network, translate them into the QoS parameters for the cloud, allocate the required resources, and enforce them across one or more edge sites to improve the QoE perceived by end users.

An embodiment is a method by one or more computing devices to configure an edge cloud to meet an E2E performance target for a microservices-based application that is implemented over the edge cloud and a mobile network communicatively coupled to the edge cloud. The method includes obtaining network-side QoS control information and network-side performance information associated with the application, determining a cloud-side performance target for the application based on the E2E performance target, the network-side QoS control information, and the network-side performance information, obtaining cloud-side service information, cloud-side resource usage information, and cloud-side performance information associated with the application, determining microservice instances of a microservice chain in the edge cloud that can be used to meet the cloud-side performance target for the application based on the cloud-side service information, the cloud-side resource usage information, and the cloud-side performance information, determining cloud-side QoS parameters for the microservice instances based on the cloud-side performance target and knowledge regarding a performance associated with the cloud-side QoS parameters, determining a resource configuration for the microservice instances based on the cloud-side performance target for the application, the cloud-side service information, the cloud-side resource usage information, and the cloud-side performance information, and configuring the edge cloud to implement the microservice instances including applying the cloud-side QoS parameters and the resource configuration to the microservice instances.

An advantage of at least some of the embodiments disclosed herein is that they are able to synchronize QoS between the mobile network and the edge cloud, and thereby improve E2E end user experience. Also, certain embodiments are able to handle multiple and dynamically changing QoS parameters and their mapping in a cross-domain environment for application performance adaptability. Other advantages will be apparent to those skilled in the relevant art in view of this disclosure. Various embodiments are further described herein with reference to the accompanying figures.

FIG. 1 is a diagram of an environment that includes a QoS alignment controller that is operable to configure an edge cloud to meet an E2E performance target for a microservices-based application, according to some embodiments.

As shown in the figure, the environment includes a QoS alignment controller 110, a mobile network 170, and an edge cloud 160. While a certain arrangement of components is shown in the figure, it should be understood that this is merely provided as an example, and that other embodiments may use a different arrangement of components to carry out the same or similar functionality as described herein.

The mobile network 170 may be a communication network that allows mobile communication devices (e.g., user equipment (UE) 176) to communicate wirelessly with other mobile communication devices and/or other networks. As shown in the figure, the mobile network 170 includes a network exposure function (NEF) 171, a policy control function (PCF) 172, a session management function (SMF) 173, user plane functions (UPFs) 174A and 174B, radio access networks (RANs) 175A and 175B, and user equipments (UEs) 176A and 176B.

The UEs 176 may be mobile communication devices operated by end users to communicate wirelessly via the mobile network 170. Examples of a UE 176 include, but are not limited to, a smart phone, mobile phone, cell phone, voice over IP (VOIP) phone, wireless local loop phone, desktop computer, personal digital assistant (PDA), wireless cameras, gaming console or device, music storage device, playback appliance, wearable terminal device, wireless endpoint, mobile station, tablet, laptop, laptop-embedded equipment (LEE), laptop-mounted equipment (LME), smart device, wireless customer-premise equipment (CPE), vehicle-mounted or vehicle embedded/integrated wireless device, etc.

The RANs 175 may implement radio access technology that allows UEs 176 to wirelessly access the mobile network 170. In the example shown in the figure, RAN 175A is communicatively coupled between UE 176A and UPF 174A and RAN 175B is communicatively coupled between UE 176B and UPF 174B. UE 176A may connect to UPF 174A via RAN 175A. UE 176B may connect to UPF 174B via RAN 175B.

The UPFs 174 may provide various user plane functionality including packet routing. In the example shown in the figure, UPF 174A has connectivity to edge cluster 165A and UPF 174B has connectivity to edge cluster 165B. The UPFs 174 may route packets received from the UEs 176 to the edge clusters 165 and/or route packets received from the edge clusters 165 to the UEs 176. For sake of illustration only, the figure shows each UPF 174 having connectivity to a single edge cluster 165. However, in other embodiments, a UPF 174 may have connectivity to more than one edge cluster 165 and/or an edge cluster 165 may have connectivity to more than one UPF 174.

The NEF 171 may expose services or resources (e.g., over application programming interfaces (APIs)) within and outside of the mobile network core. As shown in the figure, the NEF may be communicatively coupled to an application function (AF) 177, the PCF 172, and the SMF 173.

The PCF 172 may provide QoS policy and charging control functions. As shown in the figure, the PCF 172 may be communicatively coupled to the AF 177 and the SMF 173.

The SMF 173 may manage UE sessions. As shown in the figure, the SMF 173 may be communicatively coupled to UPF 174B.

The mobile network 170 shown in the figure is an example of a 5G mobile network. However, it should be understood that in other embodiments the mobile network 170 may be a different type of mobile network (e.g., a 4G Long Term Evolution (LTE) mobile network). In such embodiments, the components of the mobile network 170 may be different than those shown in the figure.

The edge cloud 160 may be a cloud infrastructure that is located near the mobile network 170 (or at the "edge" of the mobile network 170). As shown in the figure, the edge cloud 160 includes geographically distributed edge sites 162A and 162B. Each edge site 162 may include one or more edge clusters 165. For example, edge site 162A includes edge cluster 165A and edge site 162B includes edge cluster 165B. An edge cluster 165 may include a set of compute nodes that can run applications. The edge clusters 165 may be container-based or VM-based clusters. In one embodiment, one or more of the edge clusters 165 are Kubernetes clusters.

Each edge cluster 165 may include a local monitor 167 and an orchestrator 169. For example, as shown in the figure, edge cluster 165A includes local monitor 167A and orchestrator 169A and edge cluster 165B includes local monitor 167B and orchestrator 169B. Local monitor 167A may monitor various aspects of edge cluster 165A and local monitor 167B may monitor various aspects of edge cluster 165B (e.g., monitoring of microservices implemented in the edge cluster 165, resource usage of the edge cluster 165, and performance of the edge cluster 165). Orchestrator 169A may provide cloud orchestration functionality for edge cluster 165A and orchestrator 169B may provide cloud orchestration functionality for edge cluster 165B (e.g., automated configuration, coordination, and management of computer systems and software).

Each edge cluster 165 may implement one or more microservices. For example, as shown in the figure, edge cluster 165A may implement microservices MS1, MS2, MS4, and MS7 and edge cluster 165B may implement microservices MS3, MS5, MS6, MS8, and MS9. As depicted by the arrows between the different microservices in the figure, multiple microservices may communicate with each other and be linked together to form microservice chains. A microservice chain may span multiple edge clusters 165 (which may be in the same or different edge sites 162). Also, multiple instances of a microservice may be implemented in multiple edge clusters 165 (which may be in the same or different edge sites 162).

An edge site 162 may have connectivity with other edge sites 162. This allows microservices implemented in different edge sites 162 to communicate with each other, when needed. In one embodiment, connectivity between edge sites 162 is achieved using a service mesh (e.g., Istio service mesh).

A microservices-based application may be implemented over the mobile network 170 and the edge cloud 160. The E2E performance of such an application may depend on the performance of the application on both the network side (at mobile network 170) and the cloud side (at edge cloud 160).

As mentioned above, the environment includes a QoS alignment controller 110. As will be further described herein, the QoS alignment controller 110 may configure the edge cloud 160 to meet an E2E performance target for a microservices-based application (it can be seen as "aligning" the QoS in the edge cloud 160 with the QoS in the mobile network 170 to achieve the E2E performance target). As shown in the figure, the QoS alignment controller 110 includes a service and infrastructure data manager 120, a QoS mapper 130, a mobile network data manager 140, and a QoS actuator 150, each of which are further described herein below.

The mobile network data manager 140 may be communicatively coupled to the mobile network 170 obtain various information regarding the mobile network 170. Such information may be referred to herein as "network-side" information. In one embodiment, the mobile network data manager 140 obtains network-side QoS control information and network-side performance information associated with an application over a period of time. The network-side QoS control information may include a QoS indicator (e.g., 5QI) and/or an ARP value associated with the application (or other QoS parameters associated with the application) in the mobile network 170. The network-side performance information may include information regarding the latency (e.g., UPF to UF round trip time (RTT)) and/or throughput associated with the application in the mobile network 170.

The mobile network data manager 140 may obtain network-side information from network functions of the mobile network 170 that expose information about the mobile network 170. For example, the mobile network data manager 140 may obtain network-side QoS control information from the PCF 172 of the mobile network 170 and obtain network-side performance information from the NEF 171 of the mobile network 170. In one embodiment, the mobile network data manager 140 obtains network-side information directly from the AF 177 (however, this may require that the mobile network data manager 140 communicate with many AFs, which may introduce additional overhead and complexity). The way that the mobile network data manager 140 obtains network-side information may be different depending on the type of mobile network 170 being used and how the mobile network 170 exposes information.

The mobile network data manager 140 may send the network-side information that it obtained, including the network-side QoS control information and the network-side performance information associated with the application, to the QoS mapper 130.

The service and infrastructure data manager 120 may be communicatively coupled to the edge cloud 160 and obtain various information regarding the edge cloud 160. Such information may be referred to herein as "cloud-side" information. The service and infrastructure data manager 120 may obtain cloud-side information from the local monitors 167 in the edge cloud 160. For example, the service and infrastructure data manager 120 may obtain cloud-side information pertaining to edge cluster 165A from local monitor 167A and obtain cloud-side information pertaining to edge cluster 165B from local monitor 167B. As shown in the figure, the service and infrastructure data manager 120 includes a service dependency extractor 123 and a data aggregator 127, each of which are further described herein below.

The service dependency extractor 123 may obtain cloud-side service information associated with the application. The cloud-side service information associated with the application may include information regarding the microservice chains of the application in the edge cloud 160. The service dependency extractor 123 may analyze and extract microservice chains of requests at runtime. The actual path of a microservice chain (i.e., the specific microservice instances that are traversed) to serve a request might vary from time to time, as it is determined by many factors such as routing policies (e.g., based on locality), load balancing, and the content of cached data. To handle such dynamicity and capture the path of request execution, the service dependency extractor 123 may leverage techniques such as distributed tracing using the application or operating system (OS) level instrumentation or a service mesh with side-car proxies (which typically requires less application instrumentation) to extract the microservice instances of the microservice chains of requests at runtime. The service dependency extractor 123 may send the cloud-side service information (e.g., extracted microservice chains of the application and the microservice instances therein) it obtained to the data aggregator 127.

The data aggregator 127 may obtain cloud-side resource usage information and cloud-side performance information associated with the application. The cloud-side resource usage information may include information regarding the resource usage of microservice instances of the microservice chains of the application. For example, the cloud-side resource usage information may include information regarding the central processing unit (CPU) usage and/or memory usage of individual microservice instances (e.g., which are implemented by pods or virtual machines) of the microservice chains of the application. The data aggregator 127 may obtain cloud-side resource usage information using tools such as cAdvisor, Prometheus Node Exporter, and/or kubelet in Kubernetes control plane.

The cloud-side performance information may include information regarding the performance of the application in the edge cloud 160. For example, the cloud-side performance information may include information regarding the latency and/or throughput associated with the microservice instances of the microservice chains of the application. The data aggregator 127 may use various techniques to obtain cloud-side performance information depending on the type of communication channel being used for communication between microservices. For example, when message queues are being used for communication between microservices, the data aggregator 127 may use the technique described in U.S. Pat. No. 10,853,153 B2 or similar technique to obtain cloud-side performance information (e.g., traffic latency). When communication channels other than message queues are being used for communication between microservices (e.g., Hypertext Transfer Protocol (HTTP)/Transmission Control Protocol (TCP)), the data aggregator 127 may use a side-car proxy based service mesh to obtain cloud-side performance information (e.g., traffic performance among microservices that are distributed across multiple edge clusters 165).

The data aggregator 127 may aggregate cloud-side resource usage information and/or cloud-side performance information associated with the application for multiple edge clusters 165 (e.g., obtained from multiple local monitors 167 across multiple edge clusters 165, each of which may be in the same or different edge sites 162).

The service and infrastructure data manager 120 may send the cloud-side information that it obtained (and aggregated), including the cloud-side service information, the cloud-side resource usage information, and the cloud-side performance information, to the QoS mapper 130.

Thus, the QoS mapper 130 may obtain network-side information from the mobile network data manager 140 and obtain cloud-side information from the service and infrastructure data manager 120. In particular, the QoS mapper 130 may obtain network-side QoS control information and network-side performance information associated with the application from the mobile network data manager 140 and may obtain cloud-side service information, cloud-side resource usage information, and cloud-side performance information associated with the application from the service and infrastructure data manager 120. In one embodiment, the mobile network data manager 140 and/or the service and infrastructure data manager 120 sends such information to the QoS mapper 130 periodically or whenever there is updated information to send (a "push" mechanism). In other embodiments, the QoS mapper 130 may query the mobile network data manager 140 and/or the service and infrastructure data manager 120 for such information, as needed (a "pull" mechanism).

As will be further described herein, the QoS mapper 130 may determine how to configure the edge cloud 160 to meet the E2E performance target for the application based on the network-side information received from the mobile network data manager 140 and the cloud-side information received from the service and infrastructure data manager 120.

As shown in the figure, the QoS mapper 130 includes a performance target calculator 133, an instance extractor 135, and a QoS selector and resource allocator 137, each of which is further described herein below.

The performance target calculator 133 may determine a cloud-side performance target for the application based on an E2E performance target for the application, the network-side QoS control information, and the network-side performance information (e.g., the cloud-side performance target for the application may depend on the network-side performance of the application and on how far the E2E performance of the application is meeting the E2E SLO target).

The instance extractor 135 may determine (or "extract") microservice instances of a microservice chain in the edge cloud 160 that can be used to meet the cloud-side performance target for the application based on the cloud-side service information, the cloud-side resource usage information, and the cloud-side performance information. The extracted microservice instances may be implemented in a single edge cluster 165 or span across multiple edge clusters 165.

The QoS selector and resource allocator 137 may determine cloud-side QoS parameters for the extracted microservice instances based on the cloud-side performance target and knowledge regarding the performance associated with the cloud-side QoS parameters.

The QoS selector and resource allocator 137 may also determine a resource configuration for the microservice instances based on the cloud-side performance target for the application, the cloud-side service information, the cloud-side resource usage information, and the cloud-side performance information. The QoS selector and resource allocator 137 may also determine the edge clusters 165 at which the cloud-side QoS parameters and/or resource configuration are to be applied.

The QoS mapper 130 may send an indication of the microservice instances, the cloud-side QoS parameters for the microservice instances, and the resource configuration for the microservice instances (e.g., that were determined by the instance extractor 135 and the QoS selector and resource allocator 137) to the QoS actuator 150.

The QoS actuator 150 may configure the edge cloud 160 to implement those microservice instances including applying the cloud-side QoS parameters to the microservice instances and applying the resource configuration to the microservice instances. The QoS actuator 150 may configure the edge cloud 160 by configuring the appropriate edge clusters 165 in the edge cloud 160 via corresponding orchestrators 169. For example, the QoS actuator 150 may configure edge cluster 165A via orchestrator 169A and configure edge cluster 165B via orchestrator 169B.

In one embodiment, the cloud-side QoS parameters that are applied to the microservice instances include parameters related to scheduling, scaling, and traffic optimization. In one embodiment, applying the resource configuration to the microservice instances includes changing the number of replicas of a microservice instance, changing the amount of resources allocated to a microservice instance, and/or configuring the traffic routing policy for a microservice.

In one embodiment, the QoS selector and resource allocator 137 uses machine learning techniques to determine the appropriate cloud-side QoS parameters and/or resource configuration for the microservice instances. For example, the QoS selector and resource allocator 137 may use a reinforcement learning (RL) technique. With RL, a RL agent learns in an interactive environment by repeatedly taking actions and modifying states, with the goal of finding an action that maximizes cumulative reward. The learning process may initially apply a random cloud-side QoS parameters and/or cloud-side resource configuration. The RL agent may then incrementally learn from its environment while taking actions by trial and error. This may be done without knowing the explicit model of the QoS control dynamics.

The RL agent may obtain network-side QoS control information and network-side performance information associated with the application from the mobile network 170. The RL agent may also receive cloud-side performance information associated with the application from the edge cloud 160. The RL agent may take this state information and take an action to select/unselect certain cloud-side QoS parameters. After the cloud-side QoS parameters are applied (e.g., by the QoS actuator 150), the RL agent may then observe the state and calculate the cumulative reward based on the application's observed performance with respect to the cloud-side performance target. The RL agent may refine the mapping based on the state and reward until reaching a mapping that will result in the best reward (meeting the cloud-side performance target at the edge cloud 160).

The QoS alignment controller 110 may continually run in a closed-loop fashion to dynamically configure the edge cloud 160 to meet the E2E performance target for the microservices-based application based on the mapping (e.g., learned by the RL agent) as conditions change (e.g., as the performance of the mobile network 170 changes and/or the amount of resources available in an edge cluster 165 changes). The QoS alignment controller 110 may handle multiple and dynamically changing QoS parameters (with a mechanism that enables adding new QoS parameters) for application performance adaptability.

As an example, a microservices-based application may have an E2E SLO target of less than 10 milliseconds latency for 95 percent of requests. For simplicity of illustration, it is assumed that the microservice chain of the application includes three microservices (m1, m2, and m3) currently running on edge cluster A. At time t, the latency associated with the application at the mobile network side and the edge cloud side are 6 milliseconds and 3 milliseconds respectively, which is within the E2E latency limit of 10 milliseconds.

At time t+1, the 5QI QoS parameter for the application in the mobile network side is changed to a lower 5QI value (for example, due to a change in the traffic priority of the application at the network side) and the performance monitoring returns 8 milliseconds latency in the mobile network side. This will lead to a SLO violation if the application continues to perform the same at the edge cloud side as in time t (the E2E latency will be 11 milliseconds). Thus, the QoS alignment controller 110 may set a new cloud-side performance target of 2 milliseconds latency and may configure the edge cloud 160 accordingly to meet the new cloud-side performance target. For example, the QoS mapper 130 may learn that microservices m1 and m2 have a big impact on the overall microservice chain performance. In order to reduce the turn-around time for requests associated with the application, the QoS mapper 130 may determine corresponding cloud-side QoS parameters and cloud-side resource configuration to reduce the latency at the edge cloud side. For example, the QoS mapper 130 may learn that microservice m1 has a long response time and that the corresponding pod/VM has very high resource usage (e.g., high CPU and memory resource usage). This might imply the longer queueing of requests inside. The QoS mapper 130 may thus generate a policy to vertically scale up the microservice instance for microservice m1 (i.e., scale up CPU resources by thirty percent) in edge cluster A to reduce the turn-around time of request handling. The QoS mapper 130 may also learn that edge cluster B is closer to the mobile network 170 than edge cluster A (so it offers lower latency) and has capacity to host an additional instance of microservice m2. The QoS mapper 130 may horizontally scale microservice m2 in edge cluster B (e.g., by increasing the number of instances of microservice m2 by one) and updating the traffic routing configuration (e.g., to redirect twenty percent of the application traffic to the new microservice instance). The QoS actuator 150 may apply these changes using, for example, vertical and horizontal auto-scaler within the Kubernetes cloud orchestration framework and traffic prioritized load balancing functionality within service mesh to adjust resource configuration for microservice instances and traffic priority, respectively. As a result, the latency associated with the application at the edge cloud side may be reduced (e.g., to 2 milliseconds or less), and E2E SLO may be met.

Figure 2:
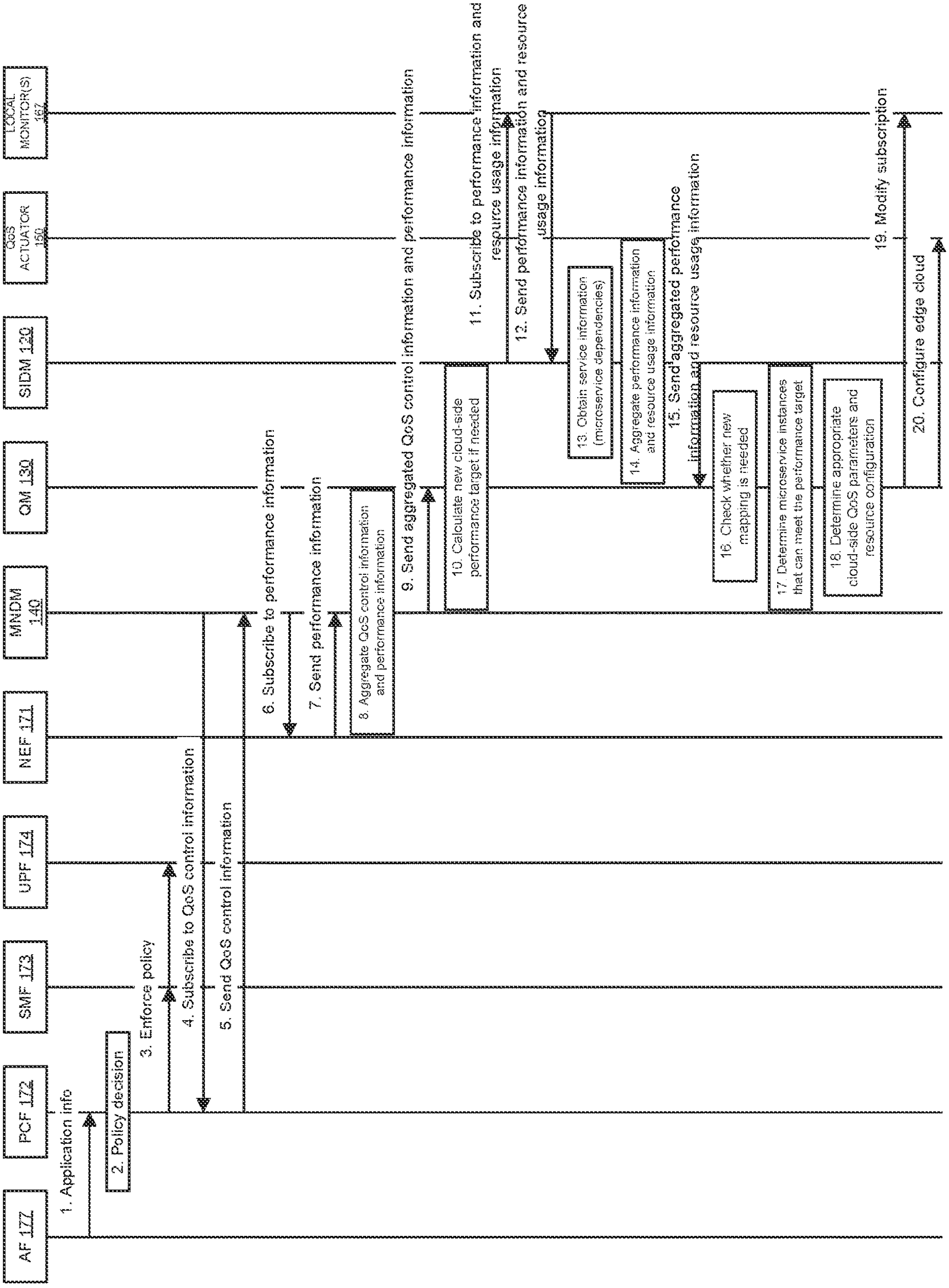
FIG. 2 is a sequence diagram showing operations for configuring an edge cloud to meet an E2E performance target for a microservices-based application, according to some embodiments.

FIG. 2 is a sequence diagram showing operations for configuring an edge cloud to meet an E2E performance target for a microservices-based application, according to some embodiments.

At operation 1, the AF 177 of the application sends information regarding the application (e.g., application identifier and QoS control information) to the PCF 172.

At operation 2, the PCF 172 evaluates and decides the QoS control (and charging) policy based on the application information received from the AF 177, the network status, and information received from the network operator.

At operation 3, the PCF 172 causes the UPF 174 to enforce the QoS control policy via the SMF 173.

At operation 4, the mobile network data manager (MNDM) 140 subscribes to the PCF 172 to receive network-side QoS control information associated with the application from the PCF 172.

At operation 5, the PCF 172 sends new/updated network-side QoS control information associated with the application to the MNDN 140. This information may include the application identifier, the QoS parameters associated with the application, and other related information.

At operation 6, the MNDM 140 subscribes to the NEF 171 to receive network-side performance information associated with the application from the NEF 171.

At operation 7, the NEF 171 sends new/updated network-side performance information associated with the application (e.g., performance metrics/events) to the MNDM 140.

At operation 8, the MNDM 140 aggregates network-side QoS control information and network-side performance information (e.g., for different flows associated with the application at different UPFs 174).

At operation 9, the MNDM 140 sends the network-side QoS control information and network-side performance information it obtained and aggregated to the QoS mapper (QM) 130.

At operation 10, the QM 130 determines a new cloud-side performance target for the application (e.g., a cloud-side SLO) based on the performance of the application at the mobile network side, if needed.

At operation 11, the service and infrastructure data manager (SIDM) 120 subscribes to the local monitor(s) 167 to receive cloud-side resource usage information and cloud-side performance information associated with microservices (and possibly infrastructure-wide resource usage information (e.g., metrics or events)) from the local monitor(s) 167.

At operation 12, the local monitor(s) 167 send cloud-side resource usage information and cloud-side performance information associated with microservices to the SIDM 120.

At operation 13, the SIDM 120 obtains cloud-side service information associated with the application, which may include information regarding microservice chains of the application in the edge cloud 160 (which may be obtained by the SIDM 120 based on extracting microservice dependencies for requests at runtime).

At operation 14, the SIDM 120 obtains and aggregates cloud-side resource usage information (e.g., CPU and memory usage) and cloud-side performance information (e.g. latency and throughput) associated with the application obtained from local monitor(s) 167 possibly across multiple edge clusters 165 (e.g., resource usage and performance of the microservice instances of the microservice chains extracted at operation 13). The SIDM 120 may also aggregate cloud-side resource usage information of edge sites 162 and/or edge clusters 165 themselves.

At operation 15, the SIDM 120 sends the cloud-side service information, cloud-side resource usage information, and cloud-side performance information it obtained and aggregated to the QM 130.

At operation 16, the QM 130 evaluates the information received from the MNDM 140 and the SIDM 120 and determines whether a new configuration is needed in the edge cloud 160 to meet the E2E performance target. If a new configuration is needed, then the QM 130 performs operation 17. If a new configuration is not needed, then the QM 130 keeps the current configuration.

At operation 17. the QM 130 determines microservice instances of a microservice chain in the edge cloud 160 that can be used to meet the cloud-side performance target. The microservice instances may be determined based on the cloud-side service information, the cloud-side resource usage information, and the cloud-side performance information.

At operation 18, the QM 130 determines cloud-side QoS parameters and a resource configuration for the microservice instances (and may also determine the edge clusters 165 in which the QoS parameters and/or resource configuration should be applied). The cloud-side QoS parameters for the microservice instances may be determined based on the cloud-side performance target and knowledge regarding the performance associated with the cloud-side QoS parameters. The resource configuration for the microservice instances may be determined based on the cloud-side performance target for the application, the cloud-side service information, the cloud-side resource usage information, and the cloud-side performance information.

At operation 19, the SIDM 120 determines whether it needs to modify its subscription to local monitors 167 to be able to properly monitor the microservice chain (e.g., the SIDM 120 may need to subscribe to a new local monitor 167 if a microservice instance of the microservice chain is implemented in a new edge cluster 165 that was not being monitored before). If so, the SIDM 120 modifies its subscription to local monitors 167 accordingly.

At operation 20, the QM 130 invokes the QoS actuator (QA) 150 to configure the edge cloud 160 to implement the microservice instances including applying the cloud-side Qos parameters and the resource configuration to the microservice instances.

Figure 3:
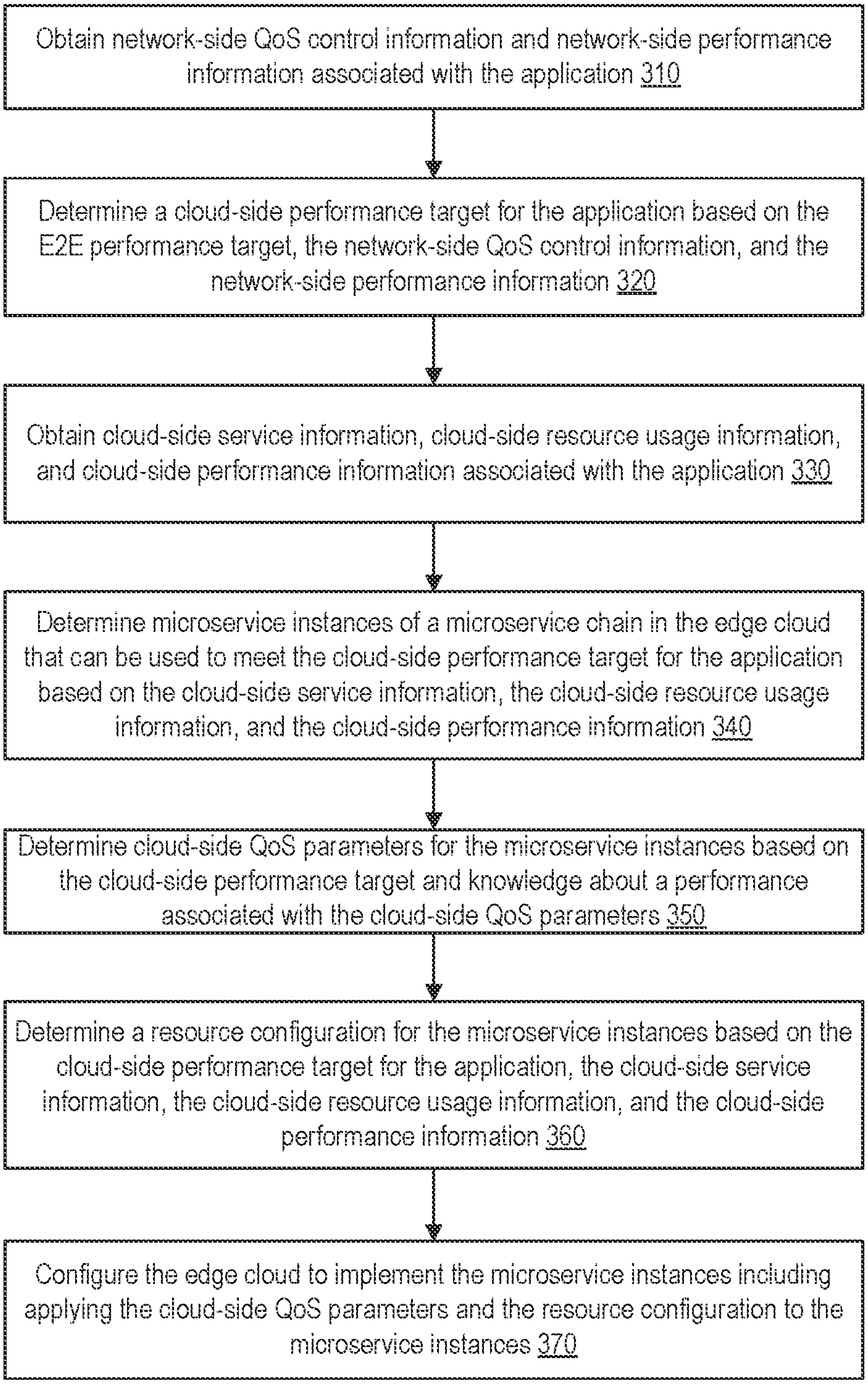
FIG. 3 is a flow diagram of a method for configuring an edge cloud to meet an E2E performance target for a microservices-based application, according to some embodiments.

FIG. 3 is a flow diagram of a method for configuring an edge cloud to meet an E2E performance target for a microservices-based application (that is implemented over the edge cloud and a mobile network communicatively coupled to the edge cloud), according to some embodiments. In one embodiment, the method is performed by one or more computing devices (e.g., that collectively implement a QoS alignment controller 110). The method may be implemented using hardware, software, firmware, or any combination thereof.

The operations in the flow diagram will be described with reference to the example embodiments of the other figures. However, it should be understood that the operations of the flow diagram can be performed by embodiments of the invention other than those discussed with reference to the other figures, and the embodiments of the invention discussed with reference to these other figures can perform operations different than those discussed with reference to the flow diagram.

At operation 310, the one or more computing devices obtain network-side Qos control information and network-side performance information associated with the application. In one embodiment, the mobile network is a 4G mobile network or a 5G mobile network. In one embodiment, the network-side QoS control information and the network-side performance information is obtained from network functions of the mobile network exposing network information (e.g., PCF and NEF of a 5G mobile network). In one embodiment, the network-side QoS control information includes a QoS indicator or an allocation and retention priority (ARP) value associated with the application in the mobile network. In one embodiment, the network-side performance information includes information regarding latency or throughput associated with the application in the mobile network.

At operation 320, the one or more computing devices determine a cloud-side performance target for the application based on the E2E performance target, the network-side QoS control information, and the network-side performance information.

At operation 330, the one or more computing devices obtain cloud-side service information, cloud-side resource usage information, and cloud-side performance information associated with the application. In one embodiment, the cloud-side service information includes information regarding microservice chains of the application in the edge cloud. In one embodiment, the cloud-side resource usage information includes information regarding resource usage (e.g., CPU usage and/or memory usage) of microservice instances of the microservice chains. In one embodiment, the cloud-side performance information includes information regarding latency or throughput associated with microservice instances of the microservice chains.

At operation 340, the one or more computing devices determine microservice instances of a microservice chain in the edge cloud that can be used to meet the cloud-side performance target for the application based on the cloud-side service information, the cloud-side resource usage information, and the cloud-side performance information. In one embodiment, the microservice instances span across a plurality of edge clusters.

At operation 350, the one or more computing devices determine cloud-side QoS parameters for the microservice instances based on the cloud-side performance target and knowledge regarding a performance associated with the cloud-side QoS parameters.

At operation 360, the one or more computing devices determine a resource configuration for the microservice instances based on the cloud-side performance target for the application, the cloud-side service information, the cloud-side resource usage information, and the cloud-side performance information.

At operation 370, the one or more computing devices configure the edge cloud to implement the microservice instances, which including applying the cloud-side QoS parameters and the resource configuration to the microservice instances. In one embodiment, the cloud-side QoS parameters that are applied to the microservice instances include parameters related to scheduling, scaling, and traffic optimization. In one embodiment, applying the resource configuration to the microservice instances includes one or more of changing a number of replicas of a microservice instance, changing an amount of resources allocated to a microservice instance, and configuring a traffic routing policy for a microservice.

Figure 4A:
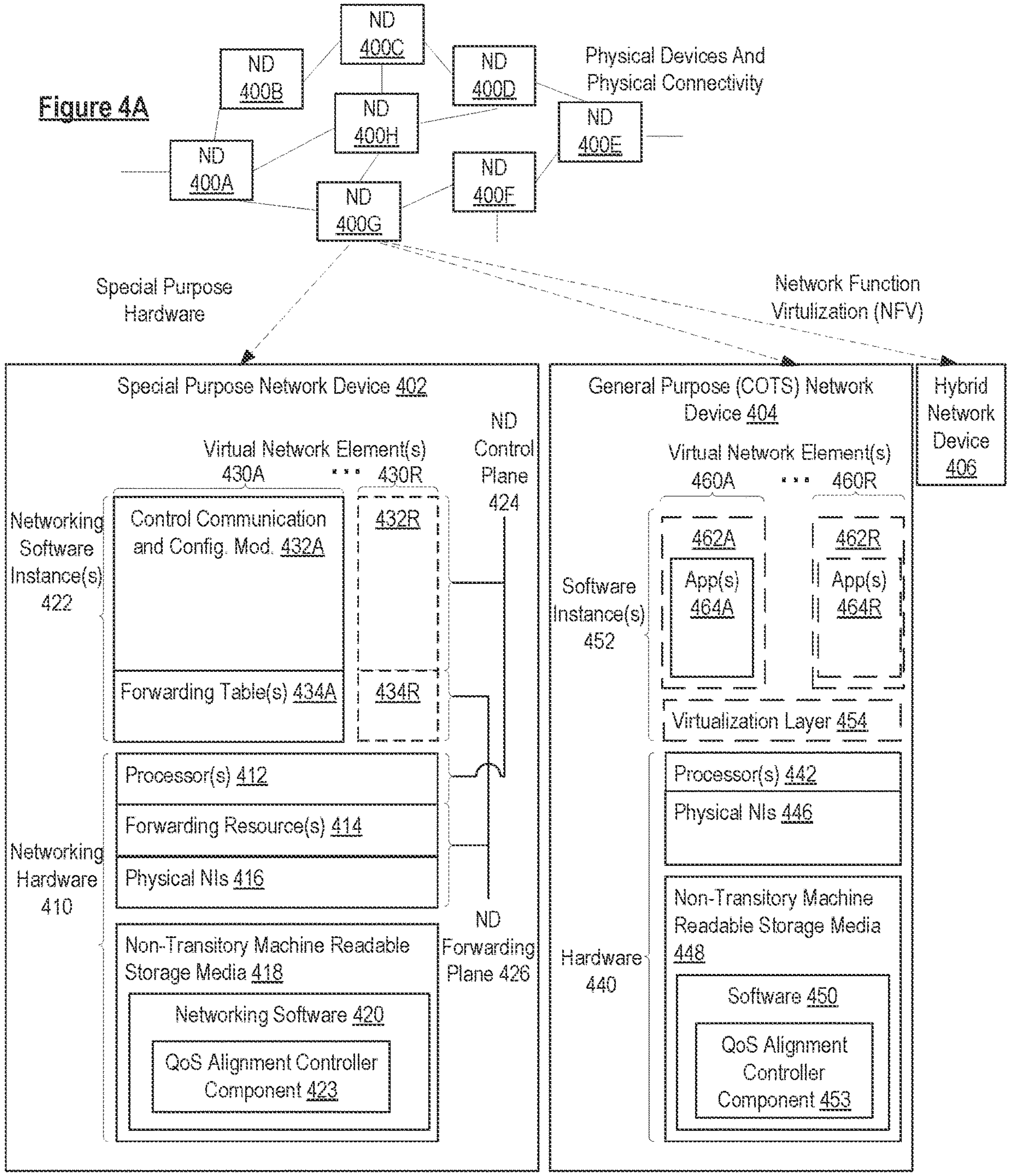
FIG. 4A illustrates connectivity between network devices (NDs) within an example network, as well as three example implementations of the NDs, according to some embodiments of the invention.

FIG. 4A illustrates connectivity between network devices (NDs) within an example network, as well as three example implementations of the NDs, according to some embodiments of the invention. FIG. 4A shows NDs 400A-H, and their connectivity by way of lines between 400A-400B, 400B-400C, 400C-400D, 400D-400E, 400E-400F, 400F-400G, and 400A-400G, as well as between 400H and each of 400A, 400C, 400D, and 400G. These NDs are physical devices, and the connectivity between these NDs can be wireless or wired (often referred to as a link). An additional line extending from NDs 400A, 400E, and 400F illustrates that these NDs act as ingress and egress points for the network (and thus, these NDs are sometimes referred to as edge NDs; while the other NDs may be called core NDs).

Two of the example ND implementations in FIG. 4A are: 1) a special-purpose network device 402 that uses custom application-specific integrated-circuits (ASICs) and a special-purpose operating system (OS); and 2) a general purpose network device 404 that uses common off-the-shelf (COTS) processors and a standard OS.

The special-purpose network device 402 includes networking hardware 410 comprising a set of one or more processor(s) 412, forwarding resource(s) 414 (which typically include one or more ASICs and/or network processors), and physical network interfaces (NIs) 416 (through which network connections are made, such as those shown by the connectivity between NDs 400A-H), as well as non-transitory machine readable storage media 418 having stored therein networking software 420. During operation, the networking software 420 may be executed by the networking hardware 410 to instantiate a set of one or more networking software instance(s) 422. Each of the networking software instance(s) 422, and that part of the networking hardware 410 that executes that network software instance (be it hardware dedicated to that networking software instance and/or time slices of hardware temporally shared by that networking software instance with others of the networking software instance(s) 422), form a separate virtual network element 430A-R. Each of the virtual network element(s) (VNFs) 430A-R includes a control communication and configuration module 432A-R (sometimes referred to as a local control module or control communication module) and forwarding table(s) 434A-R, such that a given virtual network element (e.g., 430A) includes the control communication and configuration module (e.g., 432A), a set of one or more forwarding table(s) (e.g., 434A), and that portion of the networking hardware 410 that executes the virtual network element (e.g., 430A).

In one embodiment software 420 includes code such as QoS alignment controller component 423, which when executed by networking hardware 410, causes the special-purpose network device 402 to perform operations of one or more embodiments of the present invention as part of networking software instances 422 (e.g., to configure an edge cloud to meet an E2E performance target for a microservices-based application).

The special-purpose network device 402 is often physically and/or logically considered to include: 1) a ND control plane 424 (sometimes referred to as a control plane) comprising the processor(s) 412 that execute the control communication and configuration module(s) 432A-R; and 2) a ND forwarding plane 426 (sometimes referred to as a forwarding plane, a data plane, or a media plane) comprising the forwarding resource(s) 414 that utilize the forwarding table(s) 434A-R and the physical NIs 416. By way of example, where the ND is a router (or is implementing routing functionality), the ND control plane 424 (the processor(s) 412 executing the control communication and configuration module(s) 432A-R) is typically responsible for participating in controlling how data (e.g., packets) is to be routed (e.g., the next hop for the data and the outgoing physical NI for that data) and storing that routing information in the forwarding table(s) 434A-R, and the ND forwarding plane 426 is responsible for receiving that data on the physical NIs 416 and forwarding that data out the appropriate ones of the physical NIs 416 based on the forwarding table(s) 434A-R.

Figure 4B:
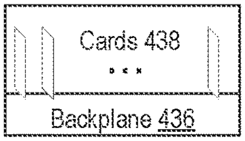
FIG. 4B illustrates an example way to implement a special-purpose network device according to some embodiments of the invention.

FIG. 4B illustrates an example way to implement the special-purpose network device 402 according to some embodiments of the invention. FIG. 4B shows a special-purpose network device including cards 438 (typically hot pluggable). While in some embodiments the cards 438 are of two types (one or more that operate as the ND forwarding plane 426 (sometimes called line cards), and one or more that operate to implement the ND control plane 424 (sometimes called control cards)), alternative embodiments may combine functionality onto a single card and/or include additional card types (e.g., one additional type of card is called a service card, resource card, or multi-application card). A service card can provide specialized processing (e.g., Layer 4 to Layer 7 services (e.g., firewall, Internet Protocol Security (IPsec), Secure Sockets Layer (SSL)/Transport Layer Security (TLS), Intrusion Detection System (IDS), peer-to-peer (P2P), Voice over IP (VOIP) Session Border Controller, Mobile Wireless Gateways (Gateway General Packet Radio Service (GPRS) Support Node (GGSN), Evolved Packet Core (EPC) Gateway)). By way of example, a service card may be used to terminate IPsec tunnels and execute the attendant authentication and encryption algorithms. These cards are coupled together through one or more interconnect mechanisms illustrated as backplane 436 (e.g., a first full mesh coupling the line cards and a second full mesh coupling all of the cards).

Returning to FIG. 4A, the general purpose network device 404 includes hardware 440 comprising a set of one or more processor(s) 442 (which are often COTS processors) and physical NIs 446, as well as non-transitory machine readable storage media 448 having stored therein software 450. During operation, the processor(s) 442 execute the software 450 to instantiate one or more sets of one or more applications 464A-R. While one embodiment does not implement virtualization, alternative embodiments may use different forms of virtualization. For example, in one such alternative embodiment the virtualization layer 454 represents the kernel of an operating system (or a shim executing on a base operating system) that allows for the creation of multiple instances 462A-R called software containers that may each be used to execute one (or more) of the sets of applications 464A-R; where the multiple software containers (also called virtualization engines, virtual private servers, or jails) are user spaces (typically a virtual memory space) that are separate from each other and separate from the kernel space in which the operating system is run; and where the set of applications running in a given user space, unless explicitly allowed, cannot access the memory of the other processes. In another such alternative embodiment the virtualization layer 454 represents a hypervisor (sometimes referred to as a virtual machine monitor (VMM)) or a hypervisor executing on top of a host operating system, and each of the sets of applications 464A-R is run on top of a guest operating system within an instance 462A-R called a virtual machine (which may in some cases be considered a tightly isolated form of software container) that is run on top of the hypervisor—the guest operating system and application may not know they are running on a virtual machine as opposed to running on a "bare metal" host electronic device, or through para-virtualization the operating system and/or application may be aware of the presence of virtualization for optimization purposes. In yet other alternative embodiments, one, some or all of the applications are implemented as unikernel(s), which can be generated by compiling directly with an application only a limited set of libraries (e.g., from a library operating system (LibOS) including drivers/libraries of OS services) that provide the particular OS services needed by the application. As a unikernel can be implemented to run directly on hardware 440, directly on a hypervisor (in which case the unikernel is sometimes described as running within a LibOS virtual machine), or in a software container, embodiments can be implemented fully with unikernels running directly on a hypervisor represented by virtualization layer 454, unikernels running within software containers represented by instances 462A-R, or as a combination of unikernels and the above-described techniques (e.g., unikernels and virtual machines both run directly on a hypervisor, unikernels and sets of applications that are run in different software containers).

The instantiation of the one or more sets of one or more applications 464A-R, as well as virtualization if implemented, are collectively referred to as software instance(s) 452. Each set of applications 464A-R, corresponding virtualization construct (e.g., instance 462A-R) if implemented, and that part of the hardware 440 that executes them (be it hardware dedicated to that execution and/or time slices of hardware temporally shared), forms a separate virtual network element(s) 460A-R.

The virtual network element(s) 460A-R perform similar functionality to the virtual network element(s) 430A-R—e.g., similar to the control communication and configuration module(s) 432A and forwarding table(s) 434A (this virtualization of the hardware 440 is sometimes referred to as network function virtualization (NFV)). Thus, NFV may be used to consolidate many network equipment types onto industry standard high volume server hardware, physical switches, and physical storage, which could be located in Data centers, NDs, and customer premise equipment (CPE). While embodiments of the invention are illustrated with each instance 462A-R corresponding to one VNE 460A-R, alternative embodiments may implement this correspondence at a finer level granularity (e.g., line card virtual machines virtualize line cards, control card virtual machine virtualize control cards, etc.); it should be understood that the techniques described herein with reference to a correspondence of instances 462A-R to VNEs also apply to embodiments where such a finer level of granularity and/or unikernels are used.

In certain embodiments, the virtualization layer 454 includes a virtual switch that provides similar forwarding services as a physical Ethernet switch. Specifically, this virtual switch forwards traffic between instances 462A-R and the physical NI(s) 446, as well as optionally between the instances 462A-R; in addition, this virtual switch may enforce network isolation between the VNEs 460A-R that by policy are not permitted to communicate with each other (e.g., by honoring virtual local area networks (VLANs)).

In one embodiment, software 450 includes code such as QoS alignment controller component 453, which when executed by processor(s) 442, causes the general purpose network device 404 to perform operations of one or more embodiments of the present invention as part of software instances 462A-R (e.g., to configure an edge cloud to meet an E2E performance target for a microservices-based application).

The third example ND implementation in FIG. 4A is a hybrid network device 406, which includes both custom ASICs/special-purpose OS and COTS processors/standard OS in a single ND or a single card within an ND. In certain embodiments of such a hybrid network device, a platform VM (i.e., a VM that that implements the functionality of the special-purpose network device 402) could provide for para-virtualization to the networking hardware present in the hybrid network device 406.

A network interface (NI) may be physical or virtual; and in the context of IP, an interface address is an IP address assigned to a NI, be it a physical NI or virtual NI. A virtual NI may be associated with a physical NI, with another virtual interface, or stand on its own (e.g., a loopback interface, a point-to-point protocol interface). A NI (physical or virtual) may be numbered (a NI with an IP address) or unnumbered (a NI without an IP address). A loopback interface (and its loopback address) is a specific type of virtual NI (and IP address) of a NE/VNE (physical or virtual) often used for management purposes; where such an IP address is referred to as the nodal loopback address. The IP address(es) assigned to the NI(s) of a ND are referred to as IP addresses of that ND; at a more granular level, the IP address(es) assigned to NI(s) assigned to a NE/VNE implemented on a ND can be referred to as IP addresses of that NE/VNE.

Figure 5:
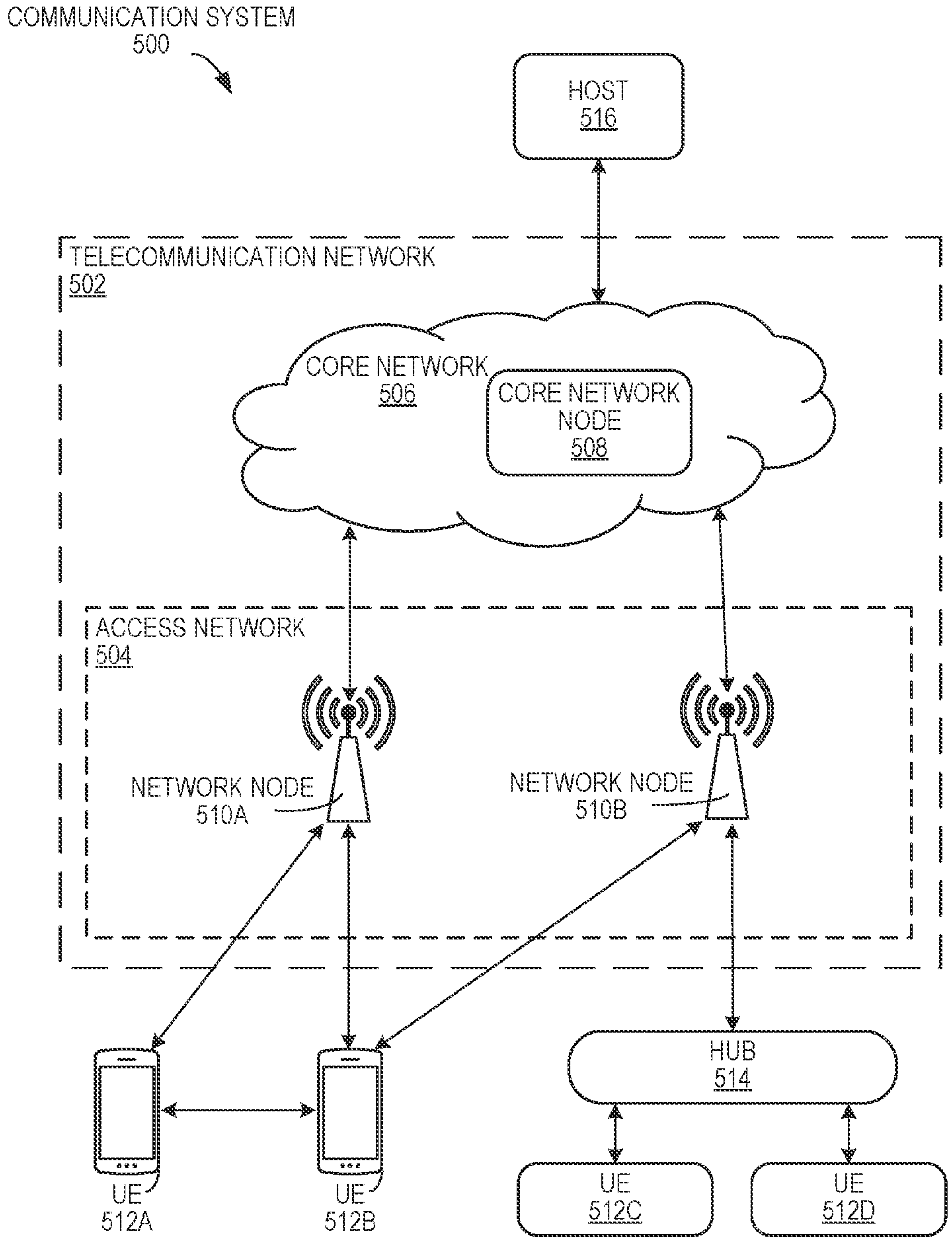
FIG. 5 shows an example of a communication system, according to some embodiments.

FIG. 5 shows an example of a communication system 500, according to some embodiments. Embodiments for QoS alignment may be implemented in the context of communication system 500.

In the example, the communication system 500 includes a telecommunication network 502 that includes an access network 504, such as a radio access network (RAN), and a core network 506, which includes one or more core network nodes 508. The access network 504 includes one or more access network nodes, such as network nodes 510*a* and 510*b* (one or more of which may be generally referred to as network nodes 510), or any other similar 3rd Generation Partnership Project (3GPP) access node or non-3GPP access point. The network nodes 510 facilitate direct or indirect connection of user equipment (UE), such as by connecting UEs 512*a*, 512*b*, 512*c*, and 512*d* (one or more of which may be generally referred to as UEs 512) to the core network 506 over one or more wireless connections.

Example wireless communications over a wireless connection include transmitting and/or receiving wireless signals using electromagnetic waves, radio waves, infrared waves, and/or other types of signals suitable for conveying information without the use of wires, cables, or other material conductors. Moreover, in different embodiments, the communication system 500 may include any number of wired or wireless networks, network nodes, UEs, and/or any other components or systems that may facilitate or participate in the communication of data and/or signals whether via wired or wireless connections. The communication system 500 may include and/or interface with any type of communication, telecommunication, data, cellular, radio network, and/or other similar type of system.

The UEs 512 may be any of a wide variety of communication devices, including wireless devices arranged, configured, and/or operable to communicate wirelessly with the network nodes 510 and other communication devices. Similarly, the network nodes 510 are arranged, capable, configured, and/or operable to communicate directly or indirectly with the UEs 512 and/or with other network nodes or equipment in the telecommunication network 502 to enable and/or provide network access, such as wireless network access, and/or to perform other functions, such as administration in the telecommunication network 502.

In the depicted example, the core network 506 connects the network nodes 510 to one or more hosts, such as host 516. These connections may be direct or indirect via one or more intermediary networks or devices. In other examples, network nodes may be directly coupled to hosts. The core network 506 includes one more core network nodes (e.g., core network node 508) that are structured with hardware and software components. Features of these components may be substantially similar to those described with respect to the UEs, network nodes, and/or hosts, such that the descriptions thereof are generally applicable to the corresponding components of the core network node 508. Example core network nodes include functions of one or more of a Mobile Switching Center (MSC), Mobility Management Entity (MME), Home Subscriber Server (HSS), Access and Mobility Management Function (AMF), Session Management Function (SMF), Authentication Server Function (AUSF), Subscription Identifier De-concealing function (SIDF), Unified Data Management (UDM), Security Edge Protection Proxy (SEPP), Network Exposure Function (NEF), and/or a User Plane Function (UPF).

The host 516 may be under the ownership or control of a service provider other than an operator or provider of the access network 504 and/or the telecommunication network 502, and may be operated by the service provider or on behalf of the service provider. The host 516 may host a variety of applications to provide one or more service. Examples of such applications include live and pre-recorded audio/video content, data collection services such as retrieving and compiling data on various ambient conditions detected by a plurality of UEs, analytics functionality, social media, functions for controlling or otherwise interacting with remote devices, functions for an alarm and surveillance center, or any other such function performed by a server.

As a whole, the communication system 500 of FIG. 5 enables connectivity between the UFs, network nodes, and hosts. In that sense, the communication system may be configured to operate according to predefined rules or procedures, such as specific standards that include, but are not limited to: Global System for Mobile Communications (GSM); Universal Mobile Telecommunications System (UMTS); Long Term Evolution (LTE), and/or other suitable 2G, 3G, 4G, 5G standards, or any applicable future generation standard (e.g., 6G); wireless local area network (WLAN) standards, such as the Institute of Electrical and Electronics Engineers (IEEE) 802.11 standards (WiFi); and/or any other appropriate wireless communication standard, such as the Worldwide Interoperability for Microwave Access (WiMax), Bluetooth, Z-Wave, Near Field Communication (NFC) ZigBee, LiFi, and/or any low-power wide-area network (LPWAN) standards such as LoRa and Sigfox.

In some examples, the telecommunication network 502 is a cellular network that implements 3GPP standardized features. Accordingly, the telecommunications network 502 may support network slicing to provide different logical networks to different devices that are connected to the telecommunication network 502. For example, the telecommunications network 502 may provide Ultra Reliable Low Latency Communication (URLLC) services to some UEs, while providing Enhanced Mobile Broadband (eMBB) services to other UEs, and/or Massive Machine Type Communication (mMTC)/Massive IoT services to yet further UEs.

In some examples, the UEs 512 are configured to transmit and/or receive information without direct human interaction. For instance, a UE may be designed to transmit information to the access network 504 on a predetermined schedule, when triggered by an internal or external event, or in response to requests from the access network 504. Additionally, a UE may be configured for operating in single- or multi-RAT or multi-standard mode. For example, a UE may operate with any one or combination of Wi-Fi, NR (New Radio) and LTE, i.e. being configured for multi-radio dual connectivity (MR-DC), such as E-UTRAN (Evolved-UMTS Terrestrial Radio Access Network) New Radio-Dual Connectivity (EN-DC).

In the example, the hub 514 communicates with the access network 504 to facilitate indirect communication between one or more UEs (e.g., UE 512*c* and/or 512*d*) and network nodes (e.g., network node 510*b*). In some examples, the hub 514 may be a controller, router, content source and analytics, or any of the other communication devices described herein regarding UEs. For example, the hub 514 may be a broadband router enabling access to the core network 506 for the UEs. As another example, the hub 514 may be a controller that sends commands or instructions to one or more actuators in the UEs. Commands or instructions may be received from the UEs, network nodes 510, or by executable code, script, process, or other instructions in the hub 514. As another example, the hub 514 may be a data collector that acts as temporary storage for UE data and, in some embodiments, may perform analysis or other processing of the data. As another example, the hub 514 may be a content source. For example, for a UE that is a VR headset, display, loudspeaker or other media delivery device, the hub 514 may retrieve VR assets, video, audio, or other media or data related to sensory information via a network node, which the hub 514 then provides to the UE either directly, after performing local processing, and/or after adding additional local content. In still another example, the hub 514 acts as a proxy server or orchestrator for the UEs, in particular in if one or more of the UEs are low energy IoT devices.

The hub 514 may have a constant/persistent or intermittent connection to the network node 510*b*. The hub 514 may also allow for a different communication scheme and/or schedule between the hub 514 and UEs (e.g., UE 512*c* and/or 512*d*), and between the hub 514 and the core network 506. In other examples, the hub 514 is connected to the core network 506 and/or one or more UEs via a wired connection. Moreover, the hub 514 may be configured to connect to an M2M service provider over the access network 504 and/or to another UE over a direct connection. In some scenarios, UEs may establish a wireless connection with the network nodes 510 while still connected via the hub 514 via a wired or wireless connection. In some embodiments, the hub 514 may be a dedicated hub—that is, a hub whose primary function is to route communications to/from the UEs from/to the network node 510*b*. In other embodiments, the hub 514 may be a non-dedicated hub that is, a device which is capable of operating to route communications between the UEs and network node 510*b*, but which is additionally capable of operating as a communication start and/or end point for certain data channels.

Figure 6:
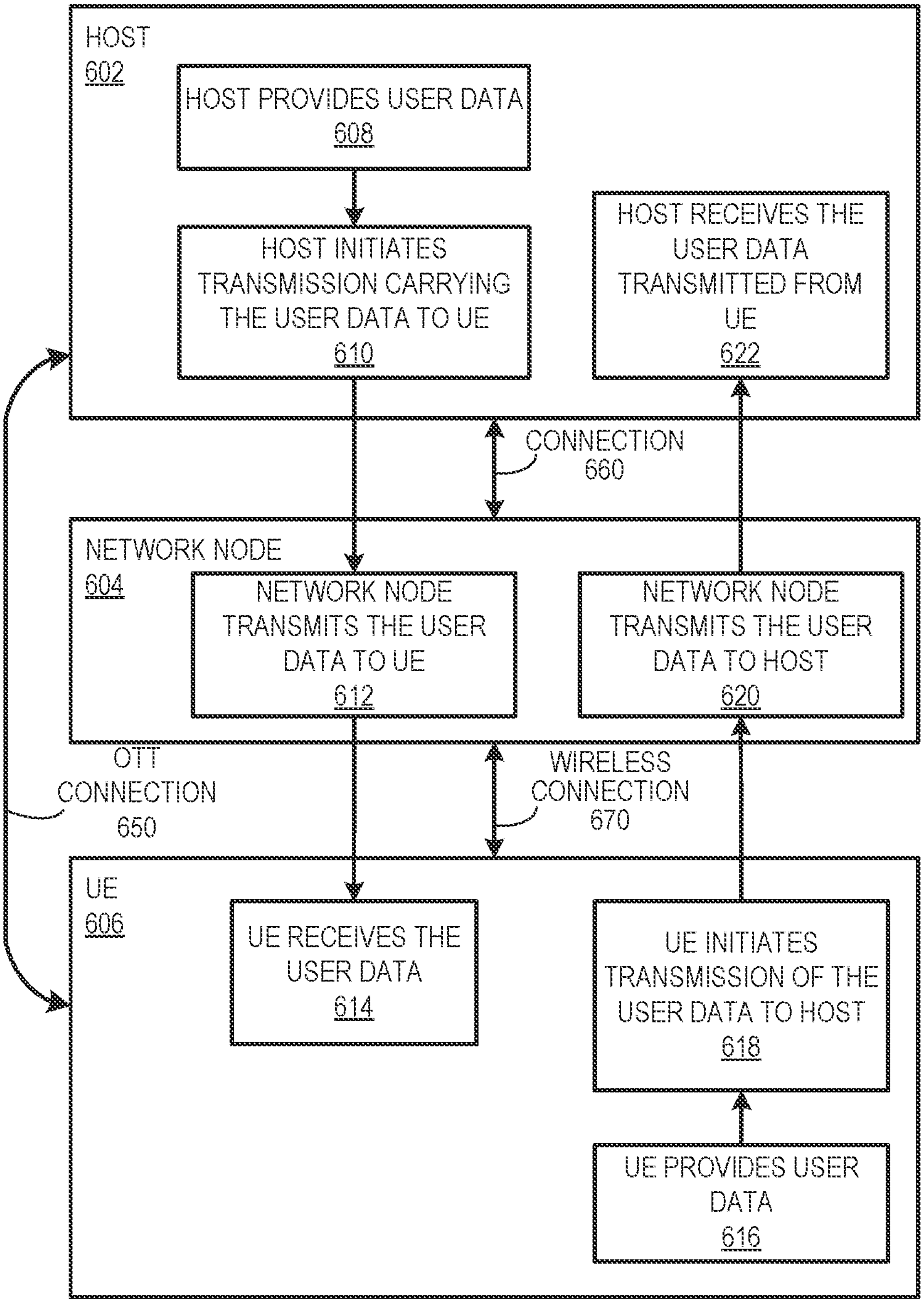
FIG. 6 shows a communication diagram of a host communicating via a network node with a user equipment (UE) over a partially wireless connection, according to some embodiments.

FIG. 6 shows a communication diagram of a host 602 communicating via a network node 604 with a UE 606 over a partially wireless connection, according to some embodiments. Example implementations, in accordance with various embodiments, of the UE (such as a UE 512*a* of FIG. 5), network node (such as network node 510*a* of FIG. 5), and host (such as host 516 of FIG. 5) discussed in the preceding paragraphs will now be described with reference to FIG. 6. Embodiments for QoS alignment may be implemented in the context of the communications shown in FIG. 6.

Embodiments of host 602 include hardware, such as a communication interface, processing circuitry, and memory. The host 602 also includes software, which is stored in or accessible by the host 602 and executable by the processing circuitry. The software includes a host application that may be operable to provide a service to a remote user, such as the UE 606 connecting via an over-the-top (OTT) connection 650 extending between the UE 606 and host 602. In providing the service to the remote user, a host application may provide user data which is transmitted using the OTT connection 650.

The network node 604 includes hardware enabling it to communicate with the host 602 and UF 606. The connection 660 may be direct or pass through a core network (like core network 506 of FIG. 5) and/or one or more other intermediate networks, such as one or more public, private, or hosted networks. For example, an intermediate network may be a backbone network or the Internet.

The UE 606 includes hardware and software, which is stored in or accessible by UE 606 and executable by the UE's processing circuitry. The software includes a client application, such as a web browser or operator-specific "app" that may be operable to provide a service to a human or non-human user via UE 606 with the support of the host 602. In the host 602, an executing host application may communicate with the executing client application via the OTT connection 650 terminating at the UE 606 and host 602. In providing the service to the user, the UE's client application may receive request data from the host's host application and provide user data in response to the request data. The OTT connection 650 may transfer both the request data and the user data. The UE's client application may interact with the user to generate the user data that it provides to the host application through the OTT connection 650.

The OTT connection 650 may extend via a connection 660 between the host 602 and the network node 604 and via a wireless connection 670 between the network node 604 and the UE 606 to provide the connection between the host 602 and the UE 606. The connection 660 and wireless connection 670, over which the OTT connection 650 may be provided, have been drawn abstractly to illustrate the communication between the host 602 and the UE 606 via the network node 604, without explicit reference to any intermediary devices and the precise routing of messages via these devices.

As an example of transmitting data via the OTT connection 650, in step 608, the host 602 provides user data, which may be performed by executing a host application. In some embodiments, the user data is associated with a particular human user interacting with the UE 606. In other embodiments, the user data is associated with a UE 606 that shares data with the host 602 without explicit human interaction. In step 610, the host 602 initiates a transmission carrying the user data towards the UE 606. The host 602 may initiate the transmission responsive to a request transmitted by the UE 606. The request may be caused by human interaction with the UE 606 or by operation of the client application executing on the UE 606. The transmission may pass via the network node 604, in accordance with the teachings of the embodiments described throughout this disclosure. Accordingly, in step 612, the network node 604 transmits to the UE 606 the user data that was carried in the transmission that the host 602 initiated, in accordance with the teachings of the embodiments described throughout this disclosure. In step 614, the UE 606 receives the user data carried in the transmission, which may be performed by a client application executed on the UE 606 associated with the host application executed by the host 602.

In some examples, the UE 606 executes a client application which provides user data to the host 602. The user data may be provided in reaction or response to the data received from the host 602. Accordingly, in step 616, the UF. 606 may provide user data, which may be performed by executing the client application. In providing the user data, the client application may further consider user input received from the user via an input/output interface of the UE 606. Regardless of the specific manner in which the user data was provided, the UF 606 initiates, in step 618, transmission of the user data towards the host 602 via the network node 604. In step 620, in accordance with the teachings of the embodiments described throughout this disclosure, the network node 604 receives user data from the UE 606 and initiates transmission of the received user data towards the host 602. In step 622, the host 602 receives the user data carried in the transmission initiated by the UE 606.

One or more of the various embodiments improve the performance of OTT services provided to the UE 606 using the OTT connection 650, in which the wireless connection 670 forms the last segment. More precisely, the teachings of these embodiments may improve the E2E QoE experienced by end users (e.g., human users) when the host 602 is implemented in an edge cloud.

In an example scenario, factory status information may be collected and analyzed by the host 602. As another example, the host 602 may process audio and video data which may have been retrieved from a UE for use in creating maps. As another example, the host 602 may collect and analyze real-time data to assist in controlling vehicle congestion (e.g., controlling traffic lights). As another example, the host 602 may store surveillance video uploaded by a UE. As another example, the host 602 may store or control access to media content such as video, audio, VR or AR which it can broadcast, multicast or unicast to UEs. As other examples, the host 602 may be used for energy pricing, remote control of non-time critical electrical load to balance power generation needs, location services, presentation services (such as compiling diagrams etc. from data collected from remote devices), or any other function of collecting, retrieving, storing, analyzing and/or transmitting data.

In some examples, a measurement procedure may be provided for the purpose of monitoring data rate, latency and other factors on which the one or more embodiments improve. There may further be an optional network functionality for reconfiguring the OTT connection 650 between the host 602 and UE 606, in response to variations in the measurement results. The measurement procedure and/or the network functionality for reconfiguring the OTT connection may be implemented in software and hardware of the host 602 and/or UE 606. In some embodiments, sensors (not shown) may be deployed in or in association with other devices through which the OTT connection 650 passes, the sensors may participate in the measurement procedure by supplying values of the monitored quantities exemplified above, or supplying values of other physical quantities from which software may compute or estimate the monitored quantities. The reconfiguring of the OTT connection 650 may include message format, retransmission settings, preferred routing etc.; the reconfiguring need not directly alter the operation of the network node 604. Such procedures and functionalities may be known and practiced in the art. In certain embodiments, measurements may involve proprietary UF signaling that facilitates measurements of throughput, propagation times, latency and the like, by the host 602. The measurements may be implemented in that software causes messages to be transmitted, in particular empty or 'dummy' messages, using the OTT connection 650 while monitoring propagation times, errors, etc.

Although the computing devices described herein (e.g., UEs, network nodes, hosts) may include the illustrated combination of hardware components, other embodiments may comprise computing devices with different combinations of components. It is to be understood that these computing devices may comprise any suitable combination of hardware and/or software needed to perform the tasks, features, functions and methods disclosed herein. Determining, calculating, obtaining or similar operations described herein may be performed by processing circuitry, which may process information by, for example, converting the obtained information into other information, comparing the obtained information or converted information to information stored in the network node, and/or performing one or more operations based on the obtained information or converted information, and as a result of said processing making a determination. Moreover, while components are depicted as single boxes located within a larger box, or nested within multiple boxes, in practice, computing devices may comprise multiple different physical components that make up a single illustrated component, and functionality may be partitioned between separate components. For example, a communication interface may be configured to include any of the components described herein, and/or the functionality of the components may be partitioned between the processing circuitry and the communication interface. In another example, non-computationally intensive functions of any of such components may be implemented in software or firmware and computationally intensive functions may be implemented in hardware.

In certain embodiments, some or all of the functionality described herein may be provided by processing circuitry executing instructions stored on in memory, which in certain embodiments may be a computer program product in the form of a non-transitory computer-readable storage medium. In alternative embodiments, some or all of the functionality may be provided by the processing circuitry without executing instructions stored on a separate or discrete device-readable storage medium, such as in a hard-wired manner. In any of those particular embodiments, whether executing instructions stored on a non-transitory computer-readable storage medium or not, the processing circuitry can be configured to perform the described functionality. The benefits provided by such functionality are not limited to the processing circuitry alone or to other components of the computing device, but are enjoyed by the computing device as a whole, and/or by end users and a wireless network generally.

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method by one or more computing devices to configure an edge cloud to meet end-to-end (E2E) performance targets for microservices-based applications, the method comprising:

obtaining, for a microservices-based application that is implemented over an edge cloud and a mobile network that is communicatively coupled to the edge cloud, network-side information regarding the mobile network, wherein the network-side information comprises network-side quality of service (QoS) control information associated with the application and network-side performance information associated with performance of the application in the mobile network;

determining a cloud-side performance target for the application in the edge cloud based on an E2E performance target for the application across both the mobile network and the edge cloud, the network-side QoS control information, and the network-side performance information;

obtaining cloud-side service information, cloud-side resource usage information, and cloud-side performance information associated with the application;

determining microservice instances of a microservice chain in the edge cloud that can be used to meet the cloud-side performance target for the application based on the cloud-side service information, the cloud-side resource usage information, and the cloud-side performance information;

determining cloud-side QoS parameters for the microservice instances based on the cloud-side performance target and knowledge regarding a performance associated with the cloud-side QoS parameters;

determining a resource configuration for the microservice instances based on the cloud-side performance target for the application, the cloud-side service information, the cloud-side resource usage information, and the cloud-side performance information; and configuring the edge cloud to implement the microservice instances including applying the cloud-side QoS parameters and the resource configuration to the microservice instances.

2. The method of claim 1, wherein the mobile network is a 4G mobile network or a 5G mobile network.

3. The method of claim 1, wherein the network-side QoS control information and the network-side performance information is obtained from network functions of the mobile network exposing the network-side information.

4. The method of claim 1, wherein the network-side QoS control information includes a QoS indicator or an allocation and retention priority (ARP) value associated with the application in the mobile network, wherein the mobile network is a 5G mobile network.

5. The method of claim 1, wherein the network-side performance information includes information regarding latency or throughput associated with the application in the mobile network.

6. The method of claim 1, wherein the cloud-side service information includes information regarding microservice chains of the application in the edge cloud.

7. The method of claim 6, wherein the cloud-side resource usage information includes information regarding resource usage of microservice instances of the microservice chains.

8. The method of claim 6, wherein the cloud-side performance information includes information regarding latency or throughput associated with microservice instances of the microservice chains.

9. The method of claim 1, wherein the cloud-side QoS parameters that are applied to the microservice instances includes parameters related to scheduling, scaling, and traffic optimization.

10. The method of claim 1, wherein applying the resource configuration to the microservice instances includes one or more of changing a number of replicas of a microservice instance, changing an amount of resources allocated to a microservice instance, and configuring a traffic routing policy for a microservice.

11. The method of claim 1, wherein the microservice instances span across a plurality of edge clusters.

12. A set of non-transitory machine-readable media having computer code stored therein, which when executed by a set of one or more processors of one or more computing device, causes the one or more computing devices to perform operations for configuring an edge cloud to meet end-to-end (E2E) performance targets for microservices-based applications, the operations comprising:

obtaining, for a microservices-based application that is implemented over an edge cloud and a mobile network that is communicatively coupled to the edge cloud, network-side information regarding the mobile network, wherein the network-side information comprises network-side quality of service (QoS) control information associated with the application and network-side performance information associated with performance of the application in the mobile network;

determining a cloud-side performance target for the application in the edge cloud based on an E2E performance target for the application across both the mobile network and the edge cloud, the network-side QoS control information, and the network-side performance information;

obtaining cloud-side service information, cloud-side resource usage information, and cloud-side performance information associated with the application;

determining microservice instances of a microservice chain in the edge cloud that can be used to meet the cloud-side performance target for the application based on the cloud-side service information, the cloud-side resource usage information, and the cloud-side performance information;

determining cloud-side QoS parameters for the microservice instances based on the cloud-side performance target and knowledge regarding a performance associated with the cloud-side QoS parameters;

determining a resource configuration for the microservice instances based on the cloud-side performance target for the application, the cloud-side service information, the cloud-side resource usage information, and the cloud-side performance information; and configuring the edge cloud to implement the microservice instances including applying the cloud-side QoS parameters and the resource configuration to the microservice instances.

13. The set of non-transitory machine-readable media of claim 12, wherein the network-side QoS control information includes a QoS indicator or an allocation and retention priority (ARP) value associated with the application in the mobile network, wherein the mobile network is a 5G mobile network, and wherein the network-side performance information includes information regarding latency or throughput associated with the application in the mobile network.

14. The set of non-transitory machine-readable media of claim 12, wherein the cloud-side service information includes information regarding microservice chains of the application in the edge cloud, wherein the cloud-side resource usage information includes information regarding resource usage of microservice instances of the microservice chains, and wherein the cloud-side performance information includes information regarding latency or throughput associated with microservice instances of the microservice chains.

15. The set of non-transitory machine-readable media of claim 12, wherein the cloud-side QoS parameters that are applied to the microservice instances includes parameters related to scheduling, scaling, and traffic optimization.

16. The set of non-transitory machine-readable media of claim 12, wherein applying the resource configuration to the microservice instances includes one or more of changing a number of replicas of a microservice instance, changing an amount of resources allocated to a microservice instance, and configuring a traffic routing policy for a microservice.

17. A computing device comprising:

one or more processors; and a non-transitory machine-readable medium having computer code stored therein, which when executed by the one or more processors, causes the computing device to:

obtaining, for a microservices-based application that is implemented over an edge cloud and a mobile network that is communicatively coupled to the edge cloud, network-side information regarding the mobile network, wherein the network-side information comprises network-side quality of service (QoS) control information associated with the application and network-side performance information associated with performance of the application in the mobile network, determining a cloud-side performance target for the application in the edge cloud based on an E2E performance target for the application across both the mobile network and the edge cloud, the network-side QoS control information, and the network-side performance information, obtain cloud-side service information, cloud-side resource usage information, and cloud-side performance information associated with the application, determine microservice instances of a microservice chain in the edge cloud that can be used to meet the cloud-side performance target for the application based on the cloud-side service information, the cloud-side resource usage information, and the cloud-side performance information, determine cloud-side QoS parameters for the microservice instances based on the cloud-side performance target and knowledge regarding a performance associated with the cloud-side QoS parameters, determine a resource configuration for the microservice instances based on the cloud-side performance target for the application, the cloud-side service information, the cloud-side resource usage information, and the cloud-side performance information, and configure the edge cloud to implement the microservice instances including applying the cloud-side QoS parameters and the resource configuration to the microservice instances.

18. The computing device of claim 17, wherein the network-side QoS control information includes a QoS indicator or an allocation and retention priority (ARP) value associated with the application in the mobile network, wherein the mobile network is a 5G mobile network, and wherein the network-side performance information includes information regarding latency or throughput associated with the application in the mobile network.

19. The computing device of claim 17, wherein the cloud-side service information includes information regarding microservice chains of the application in the edge cloud, wherein the cloud-side resource usage information includes information regarding resource usage of microservice instances of the microservice chains, and wherein the cloud-side performance information includes information regarding latency or throughput associated with microservice instances of the microservice chains.

20. The computing device of claim 17, wherein the mobile network is a 4G mobile network or a 5G mobile network.

* * * * *